(12) United States Patent
Li

(10) Patent No.: US 7,626,290 B2
(45) Date of Patent: Dec. 1, 2009

(54) ONE-WHEEL AND BI-POLE MAGNETIC DRIVING APPARATUS

(76) Inventor: Lingqun Li, Tower A, Bldg., No. 14, Chuangye Yuan, Shuang D Gang, Gaoxinyuanqu, No. 12 Liaohedonglu, Dalian (CN) 116620

( * ) Notice: Subject to any disclaimer, the term of this patent is extended or adjusted under 35 U.S.C. 154(b) by 626 days.

(21) Appl. No.: 11/409,945

(22) Filed: Apr. 24, 2006

(65) Prior Publication Data

US 2006/0244322 A1 Nov. 2, 2006

(30) Foreign Application Priority Data

Apr. 29, 2005 (CN) ..................... 2005 1 0067087

(51) Int. Cl.
*H02K 41/00* (2006.01)
(52) U.S. Cl. .................... 310/12; 104/281; 104/283
(58) Field of Classification Search ............. 310/12–15, 310/90.5, 75 R, 83; 104/281, 282, 283, 286
See application file for complete search history.

(56) References Cited

U.S. PATENT DOCUMENTS

| | | |
|---|---|---|
| 3,791,308 A | 2/1974 | Hartz |
| 4,702,173 A | 10/1987 | Perrott |
| 4,776,282 A | 10/1988 | Ishikura et al. |
| 5,454,328 A | 10/1995 | Matsuzaki et al. |
| 5,467,718 A | 11/1995 | Shibata et al. |
| 5,473,209 A | 12/1995 | Lamb |
| 5,477,093 A | 12/1995 | Lamb |
| 5,477,094 A | 12/1995 | Lamb |
| 5,668,424 A | 9/1997 | Lamb |

(Continued)

FOREIGN PATENT DOCUMENTS

CN 1264660 A 8/2000

(Continued)

OTHER PUBLICATIONS

Photograph of levitation device provided by Magna Force, Inc., publication date unknown, use filing date: Apr. 24, 2006.

(Continued)

*Primary Examiner*—Dang D Le
(74) *Attorney, Agent, or Firm*—Workman Nydegger

(57) ABSTRACT

A magnetic driving apparatus includes a bi-pole rotor wheel coupled to a speed adjustment motor and including a ferromagnetic wheel base and a magnetic rotor, the magnetic rotor including first and second magnetic rotor parts which are fixed to a circumferential surface of the wheel base in parallel with each other, spaced a first gap apart, and having opposite magnetic polarity to each other, each of the first and second magnetic rotor parts being formed by arranging alternatively magnetic rectangular blocks and non-magnetic spacers, and when being mounted to a circumferential surface of the ferromagnetic wheel base, the magnetic blocks and non-magnetic spacers of the first magnetic rotor part being aligned with those of the second magnetic rotor part. A linear stator disposed at a side of the bi-pole rotor wheel is formed by arranging alternatively magnetic rectangular blocks and non-magnetic spacers on a stator base and has a width substantially equal to that of the bi-pole rotor wheel, and wherein the bi-pole rotor wheel is spaced a second gap smaller than the first gap apart from the linear stator.

6 Claims, 3 Drawing Sheets

U.S. PATENT DOCUMENTS

| | | |
|---|---|---|
| 5,691,587 A | 11/1997 | Lamb |
| 5,712,519 A | 1/1998 | Lamb |
| 5,712,520 A | 1/1998 | Lamb |
| 5,739,627 A | 4/1998 | Lamb |
| 5,778,796 A | 7/1998 | Kim |
| 5,834,872 A | 11/1998 | Lamb |
| 5,880,548 A | 3/1999 | Lamb |
| 5,903,075 A | 5/1999 | Lamb |
| 5,909,073 A | 6/1999 | Lamb |
| 5,992,575 A | 11/1999 | Kim |
| 6,005,317 A | 12/1999 | Lamb |
| 6,043,578 A | 3/2000 | Lamb |
| 6,072,258 A | 6/2000 | Lamb |
| 6,095,054 A | 8/2000 | Kawano et al. |
| 6,240,852 B1 | 6/2001 | Camp |
| 6,242,832 B1 | 6/2001 | Lamb |
| 6,337,527 B2 | 1/2002 | Lamb |
| 6,510,799 B2 | 1/2003 | Lamb et al. |
| 6,543,591 B2 | 4/2003 | Kuzuya |
| 6,644,208 B2 | 11/2003 | Akiyama |
| 6,889,419 B2 * | 5/2005 | Reiter et al. ............... 29/596 |
| 6,899,036 B2 | 5/2005 | Lamb et al. |
| 7,204,192 B2 | 4/2007 | Lamb et al. |
| 7,243,604 B2 | 7/2007 | Li |
| 2003/0084115 A1 | 5/2003 | Wood et al. |
| 2003/0205163 A1 | 11/2003 | Lamb et al. |
| 2005/0034628 A1 | 2/2005 | Lamb et al. |
| 2005/0223934 A1 | 10/2005 | Li |
| 2005/0252407 A1 | 11/2005 | Li |
| 2006/0219128 A1 | 10/2006 | Li |
| 2006/0236890 A1 | 10/2006 | Lamb et al. |
| 2007/0044677 A1 | 3/2007 | Li |

FOREIGN PATENT DOCUMENTS

| | | |
|---|---|---|
| CN | 1490207 A | 4/2004 |
| CN | 1746046 A | 3/2006 |

OTHER PUBLICATIONS

Qingchao Wei et al., *Magnetic Levitation Railway System and Technique*, China Science and Technology Publishing Company, pp. 19 and 23, Nov. 2003 (with partial English translation).

\* cited by examiner

ONE-WHEEL AND BI-POLE MAGNETIC DRIVING APPARATUS

CROSS-REFERENCE TO RELATED APPLICATIONS

This application claims priority to Chinese Patent Application No. 200510067087.5 filed Apr. 29, 2005, the disclosure of which is incorporated herein by reference.

BACKGROUND OF THE INVENTION

1. The Field of the Invention

The present invention relates to a technique of permanent magnetic drive, and more particularly, to a magnetic driving apparatus.

2. The Relevant Technology

Magnetic levitation trains in the prior art generally employ synchronous linear motors. Because of running requirements of the train, a gap between a linear rotor and a linear stator is above about 8 mm, and further because an intensity of the open magnetic field is decreased and increased in a manner of power function, such too large gap results in waste of a lot of electric energy. The synchronous linear motors are very high in cost, so that the business application of the magnetic levitation is limited. The Chinese patent publication CN1490207A disclosed a one-wheel and one-pole magnetic driving device which requires a lot of NdFeB magnets, as a result, the cost is high. The Chinese patent application No. 004100738619 disclosed a crawler type magnetic driving device, however, it can not run at an ultra high speed.

SUMMARY OF THE INVENTION

One aspect of the present invention is to solve at least part of the above problems associated with the prior art and provide a one-wheel and bi-pole magnetic driving apparatus used for a magnetic levitation train, which has a simple structure, a small empty weight, a good closure property of magnetic circuit, a large driving power, a high rotation speed and a low cost.

One embodiment of the present invention provides a one-wheel and bi-pole magnetic driving apparatus, comprising:

a bi-pole rotor wheel coupled to a speed adjustment motor and comprising a ferromagnetic wheel base and a magnetic rotor, the magnetic rotor including a first magnetic rotor part and a second magnetic rotor part, the first and second magnetic rotor parts being fixed to a circumferential surface of the wheel base in parallel, being spaced a first gap apart from each other, and having opposite magnetic polarities to each other, each of the first and second magnetic rotor parts being formed by arranging alternatively magnetic rectangular blocks and non-magnetic spacers, and when being mounted to a circumferential surface of the ferromagnetic wheel base, the magnetic blocks and non-ferromagnetic spacers of the first magnetic rotor part being aligned with that of the second magnetic rotor part, respectively; and a linear stator which is disposed at a side of the bi-pole rotor wheel, is formed by arranging alternatively ferromagnetic rectangular blocks and non-magnetic spacers on a stator base, and has a width substantially equal to that of the bi-pole rotor wheel, wherein a space between two adjacent magnetic rectangular blocks of the linear stator is substantially equal to that between two adjacent magnetic rectangular blocks of bi-pole rotor wheel in a circumferential direction of the wheel base, wherein a second gap is provided between the linear stator and the bi-pole rotor wheel and smaller than the first gap between the first and second the first and second magnetic rotor parts, and wherein the magnetic rotor and the linear stator form a magnetic circuit, and when the speed adjustment motor rotates, a pulling force is generated between the magnetic rotor and the linear stator so as to drive a train.

Preferably, two bi-pole rotor wheels and two linear stators corresponding to the two bi-pole rotor wheels are provided, and the two linear stators are disposed at outsides of the two bi-pole rotor wheels, respectively.

Further, the one-wheel and bi-pole magnetic driving apparatus comprises two pairs of guide wheels, wherein the two bi-pole rotor wheels are disposed between and leveled to the two pairs of guide wheels.

Preferably, the second gap between the bi-pole rotor wheel and the linear stator is in a range of approximate 4 mm to 60 mm.

DETAILED DESCRIPTION OF THE PREFERRED EMBODIMENTS

Embodiments of the present invention will be described in detail with reference to the accompany drawings, the embodiments described herein are explanatory and illustrative and should not be construed to limit the present invention.

The one-wheel and bi-pole magnetic driving apparatus according to the present invention can be used to a suspending track type magnetic levitation train so as to constitute a power system of the magnetic levitation train. Before describing the one-wheel and bi-pole magnetic driving apparatus according to the present invention, the suspending track type magnetic levitation train is explained briefly so as to better understand the structure and operation principle of the one-wheel and bi-pole magnetic driving apparatus according to the present invention.

Figure 1:
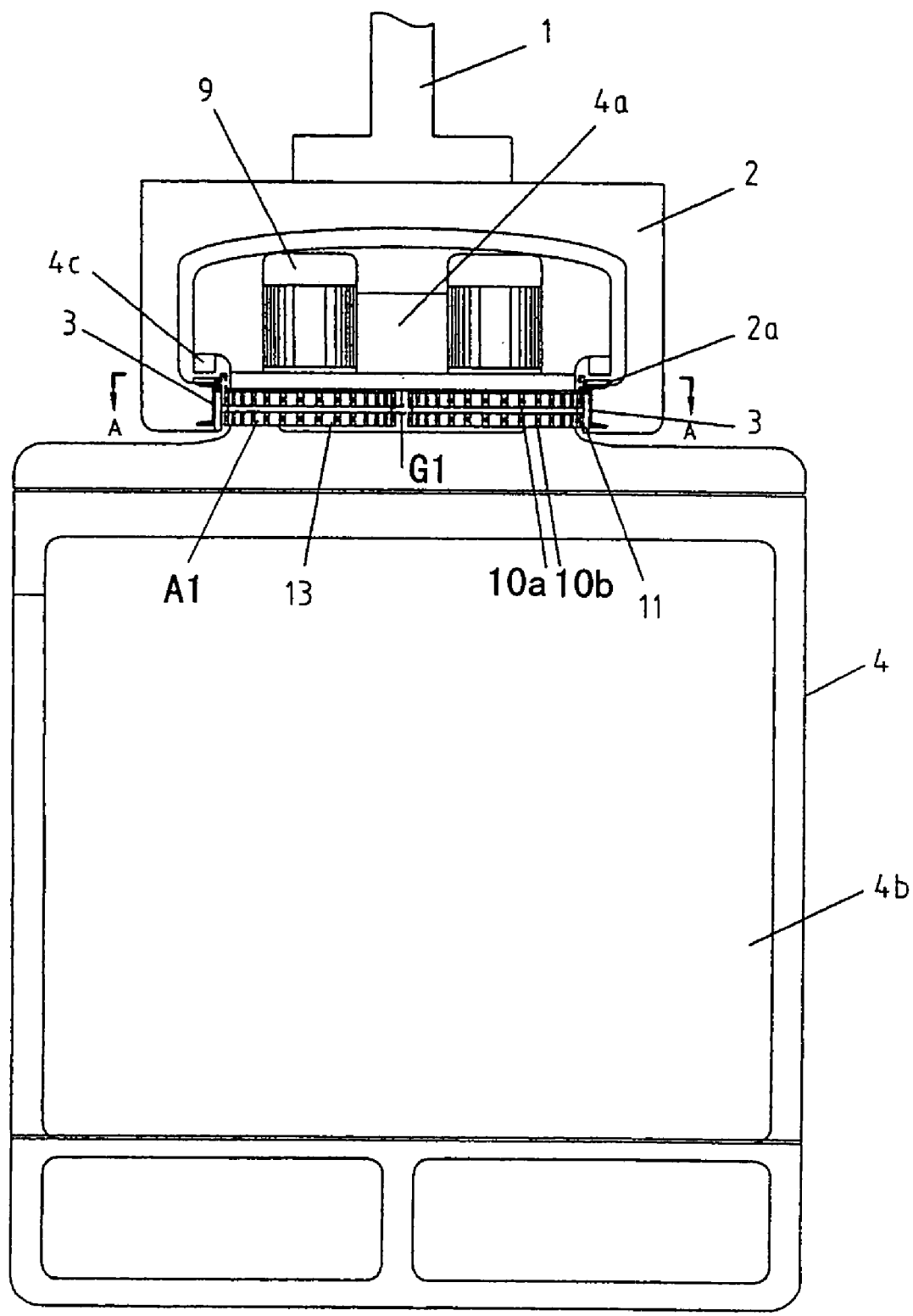
FIG. 1 is a schematic sectional view showing a one-wheel and bi-pole magnetic driving apparatus according to an embodiment of the present invention in an assembly state in a power cabin of a magnetic levitation train.
Figure 3:
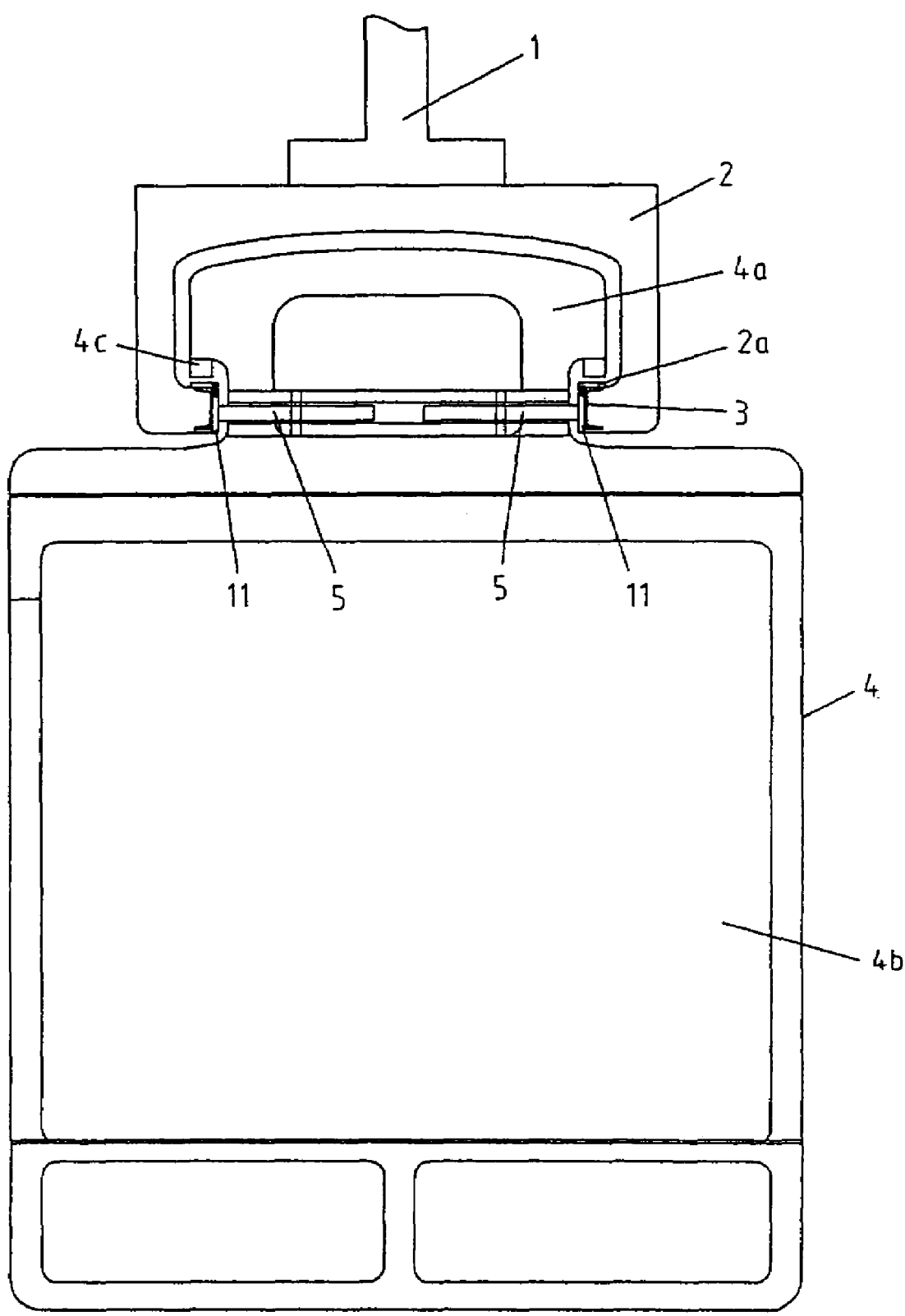
FIG. 3 is a schematic section view taken along line B-B in FIG. 1.

With reference to FIGS. 1 and 3, the suspending track type magnetic levitation train comprises a track unit and a magnetic levitation vehicle unit.

The track unit comprises a I beam 1 and a suspending arch crosstie 2 which is connected to a bottom of the I beam 1. At an open side of the suspending arch crosstie 2, permanent magnet rails 2a are disposed on top surfaces of both ends of the suspending arch crosstie 2, and stator bases 3 are disposed at end surfaces of the both ends of the suspending arch crosstie 2. The permanent magnet rails 2a are made of hard magnetic material such as NdFeB, and the stator bases 3 are made of ferromagnetic material.

The magnetic levitation vehicle unit 4 comprises an upper levitation power cabin 4a and a lower compartment 4b integrated with the levitation power cabin 4a. The levitation power cabin 4a is levitated in the suspending arch crosstie 2 and provided with wing permanent magnets 4c at both outsides thereof, the wing permanent magnets 4c correspond to the permanent magnet rails 2a, respectively. The wing permanent magnets 4c and the permanent magnet rails 2a are arranged so that their magnetic poles having the same polarity face each other and levitation gaps of about 2 mm to 40 mm are formed therebetween so as to generate upward levitation forces. Guide wheels 5 are disposed along right and left direction (horizontal direction in FIGS. 1 and 3) and contact rails of two linear stators 11 respectively so as to control the train to be centrally positioned between the two rails.

A power apparatus, which can be the one-wheel and bi-pole magnetic driving apparatus according to the present invention, is mounted inside the levitation cabin 4a.

Figure 2:
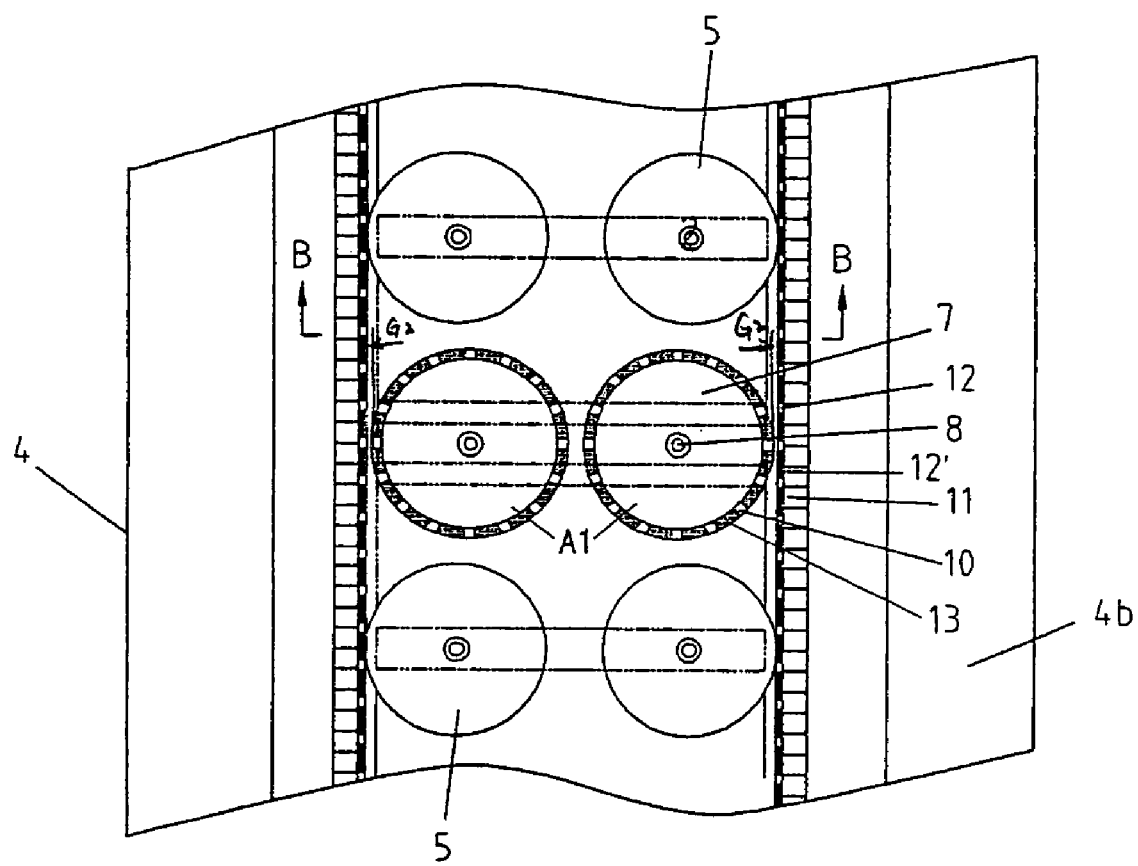
FIG. 2 is a schematic section view taken along line A-A in FIG. 1.

FIG. 2 is a schematic section view showing a planar structure of the one-wheel and bi-pole magnetic driving apparatus according to the embodiment of the present invention. Referring to FIG. 2, two one-wheel and bi-pole magnetic driving apparatuses are arranged symmetrically along right and left direction. The structure and operation principle of the two one-wheel and bi-pole magnetic driving apparatuses are identical, for the sake of the briefness, the following detailed description is only directed to one of the above two one-wheel and bi-pole magnetic driving apparatus.

The one-wheel and bi-pole magnetic driving apparatus according to the embodiment of the present application is controlled by a speed adjustment motor 9 which is used as a power resource of the magnetic driving apparatus and coaxial with a bi-pole rotor wheel A1 of the magnetic driving apparatus.

The speed adjustment motor 9 is disposed at an upper portion of the levitation power cabin 4a and the bi-pole rotor wheel A1 is disposed at a lower portion of the levitation power cabin 4a and connected to the speed adjustment motor 9 through a rotation shaft 8. The bi-pole rotor wheel A1 is located between two pairs of guide wheels 5 and in the same level with that of the guide wheels 5. The bi-pole rotor wheel A1 comprises a ferromagnetic wheel base 7 and a magnetic rotor 10.

The magnetic rotor 10 comprises a first magnetic rotor part 10a and a second magnetic rotor part 10b which are mounted to an circumferential surface of the wheel base 7 in parallel with each other. The first magnetic rotor part 10a and the second magnetic rotor part 10b have opposite magnetic polarity and are spaced a first gap G1 apart from each other. Particularly, the first magnetic rotor part 10a is of N pole and the second magnetic rotor part 10b is of S pole. Alternatively, the first magnetic rotor part 10a is of S pole and the second magnetic rotor part 10b is of N pole.

In this embodiment, as shown in FIG. 1, if the first magnetic rotor part 10a located above is of N pole, the second magnetic rotor part 10b located underneath is of S pole. The first magnetic rotor part 10a and the second magnetic rotor part 10b are formed by alternatively arranging rectangular blocks made of ferromagnetic material such as NdFeB and non-ferromagnetic spacers 13 (i.e. rotor spacers). The rotor spacer 13 can be made of aluminum alloy. The rectangular blocks of the first magnetic rotor part 10a are aligned with those of the second magnetic rotor part 10b respectively when they are mounted on the circumferential surface of the ferromagnetic wheel base 7.

A linear stator 11 is disposed on a rail which is arranged at a side of the bi-pole rotor wheel A1 and corresponds to the bi-pole rotor wheel A1. In this embodiment, as shown in FIG. 2, two bi-pole rotor wheels A1 are provided, accordingly, two linear stators 11 are also provided at outsides of the two bi-pole rotor wheels A1. Similar to the magnetic rotor 10, the linear stator 11 is also formed by alternatively arranging rectangular blocks made of ferromagnetic material and non-ferromagnetic stator spacers 12 on a stator base 3. A width of the linear stator 11 is substantially equal to that of the bi-pole rotor wheel A1 (in an upward and downward direction in FIG. 1), and when the rectangular blocks of the bi-pole rotor wheel A1 are mounted on the circumferential surface of the wheel base 7, intervals between two adjacent two ferromagnetic rectangular blocks of the bi-pole rotor wheel A1 are substantially equal to that between two adjacent ferromagnetic rectangular blocks of the linear stator 11, that is, a length of each stator spacer 12 in an upward and downward direction FIG. 2 is substantially equal to that of each rotor spacer 13 in a circumferential direction of the wheel base 7.

As described above, the first magnetic rotor part 10a and the second magnetic rotor part 10b are spaced the first gap G1 apart from each other, in addition, the bi-pole rotor wheel A1 and the linear stator 11 are spaced a second gap G2 of approximate 4 mm to 60 mm apart from each, other, in which the first gap G1 is larger than the second gap G2.

With the magnetic driving apparatus according to the present invention, the magnetic rotor 10 and the linear stator 11 form a magnetic circuit, and when the speed adjustment motor 9 rotates, a pulling force is generated between the magnetic rotor 10 and the linear stator 11 so as to drive a train.

The magnetic driving apparatus according to the present invention has the following advantages:

1. the one-wheel magnetic driving apparatus of the present invention does not require to provide power supply and transformer facilities along the magnetic levitation track, and The aggregate costs of the linear stator and the stator spacers are remarkably lower than that of the iron core and windings of the synchronous linear motor in the prior art, and more particularly the aggregate costs of the linear stator and the stator spacers are decreased by at leas two million dollars per kilometer.

2. In comparison with the linear motor in the prior art, the magnetic driving apparatus of the present invention can save about 50% energy consumption.

3. the magnetic driving apparatus of the present invention has a simple structure, a small empty weight, a large driving power, a high rotation speed and a low cost.

4. the magnetic driving apparatus of the present invention can be used widely.

While preferred embodiments of the invention have been described and illustrated above, it should be understood that these are exemplary of the invention and are not to be considered as limitation. Additions, omissions, substitutions and other modifications can be made without departing from the sprit or scope of the present invention. Accordingly, the invention is not to be considered as being limited by the foregoing description, and is only limited by the scope of the appended claims and the equivalents thereof.

What is claimed is:

1. A magnetic driving apparatus, comprising:
    a bi-pole rotor wheel coupled to a speed adjustment motor and comprising a ferromagnetic wheel base and a magnetic rotor, the magnetic rotor including a first magnetic rotor part and a second magnetic rotor part, the first and second magnetic rotor parts being fixed to a circumferential surface of the wheel base in parallel with each other, being spaced a first gap apart from each other, and having opposite magnetic polarities to each other, each of the first and second magnetic rotor parts being formed by arranging alternatively magnetic rectangular blocks and non-magnetic spacers, and when being mounted to a circumferential surface of the ferromagnetic wheel base, the magnetic blocks and non-magnetic spacers of the first magnetic rotor part being aligned with those of the second magnetic rotor part; and a linear stator which is disposed at a side of the bi-pole rotor wheel, is formed by arranging alternatively magnetic rectangular blocks and non-magnetic spacers on a stator base, and has a width substantially equal to that of the bi-pole rotor wheel, wherein a space between two adjacent magnetic rectangular blocks of the linear stator is substantially equal to that between two adjacent magnetic rectangular blocks of bi-pole rotor wheel in a circumferential direction of the wheel base, wherein a second gap is provided between the linear stator and the bi-pole rotor wheel and smaller than the first gap between the first and second magnetic rotor parts, and wherein the magnetic rotor and the linear stator form a magnetic circuit, and when the speed adjustment motor rotates, a pulling force is generated between the magnetic rotor and the linear stator so as to drive a train.

2. The magnetic driving apparatus according to claim 1, wherein two bi-pole rotor wheels and two linear stators corresponding to the two bi-pole rotor wheels are provided, and the two linear stators are disposed at outsides of the two bi-pole rotor wheels, respectively.

3. The magnetic driving apparatus according to claim 2, further comprising two pairs of guide wheels, wherein the two bi-pole rotor wheels are disposed between and leveled to the two pairs of guide wheels.

4. The magnetic driving apparatus according to claim 1, wherein the second gap between the bi-pole rotor wheel and the linear stator is in a range of approximate 4 mm to 60 mm.

5. The magnetic driving apparatus according to claim 2, wherein the second gap between the bi-pole rotor wheel and the linear stator is in a range of approximate 4 mm to 60 mm.

6. The magnetic driving apparatus according to claim 3, wherein the second gap between the bi-pole rotor wheel and the linear stator is in a range of approximate 4 mm to 60 mm.

* * * * *

UNITED STATES PATENT AND TRADEMARK OFFICE
CERTIFICATE OF CORRECTION

PATENT NO. : 7,626,290 B2  Page 1 of 1
APPLICATION NO. : 11/409945
DATED : December 1, 2009
INVENTOR(S) : Lingqun Li It is certified that error appears in the above-identified patent and that said Letters Patent is hereby corrected as shown below:

Column 2
Line 21, change "approximate" to --approximately--

Column 4
Line 19, change "approximate" to -- approximately--
Line 35, change "leas" to --least--
Line 50, change "sprit" to --spirit--

Column 6
Line 12, change "approximate" to --approximately--
Line 15, change "approximate" to --approximately--
Line 18, change "approximate" to --approximately--

Signed and Sealed this

Ninth Day of February, 2010

David J. Kappos
*Director of the United States Patent and Trademark Office*